United States Patent
Iijima

(10) Patent No.: US 7,408,454 B2
(45) Date of Patent: Aug. 5, 2008

(54) TIRE INFORMATION DETECTING APPARATUS WITHOUT DISTORTION

(75) Inventor: Kouta Iijima, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 209 days.

(21) Appl. No.: 11/219,918

(22) Filed: Aug. 31, 2005

(65) Prior Publication Data

US 2006/0049924 A1    Mar. 9, 2006

(30) Foreign Application Priority Data

Sep. 9, 2004  (JP) .............................. 2004-262428

(51) Int. Cl.
*B60C 23/00*  (2006.01)
(52) U.S. Cl. ..................... 340/447; 340/442; 340/445
(58) Field of Classification Search ......... 340/442–449; 73/146.4, 146.5
See application file for complete search history.

(56) References Cited

U.S. PATENT DOCUMENTS 3,806,905 A * 4/1974 Strenglein ................... 340/505
6,378,360 B1 * 4/2002 Bartels ....................... 73/146.5
2003/0009270 A1   1/2003 Breed
2003/0234722 A1 * 12/2003 Lonsdale et al. ............ 340/445
2004/0087297 A1 *  5/2004 Ash ............................ 455/290

FOREIGN PATENT DOCUMENTS

| DE | 196 21 354 | 12/1997 |
| JP | 2000-517073 | * 12/2000 |
| JP | 2004-145474 | 5/2004 |

* cited by examiner

*Primary Examiner*—Brent Swarthout
(74) *Attorney, Agent, or Firm*—Brinks Hofer Gilson & Lione

(57) ABSTRACT

A tire information detecting apparatus includes an interrogator which transmits an interrogation signal toward a tire in a vehicle at a transmitting timing, and receives a reply signal including tire information at a receiving timing so as to process the signals. A responder is disposed in the tire and has a sensor excited by a predetermined frequency signal for detecting tire information so as to return the reply signal to the interrogator at the receiving timing in responding to the interrogation signal. A mixer unit receives the interrogation signal having a first signal and a second signal which is spaced the predetermined frequency away from the first signal, from the interrogator, and outputs a signal of the frequency difference between the two signals to the responder by mixing the first and second signals.

4 Claims, 2 Drawing Sheets

TIRE INFORMATION DETECTING APPARATUS WITHOUT DISTORTION

This application claims the benefit of priority to Japanese Patent Application No. 2004-262428 filed on Sep. 9, 2004, herein incorporated by reference.

BACKGROUND OF THE INVENTION

1. Field of the Invention

The present invention relates to a tire information detecting apparatus for monitoring the pneumatic pressure of tires

2. Description of the Related Art

A tire information detecting apparatus according to the related art will be described with reference to FIG. 3. A controller includes at least one generator G1 for generating radio frequency with respect to a carrier signal f1 at a microwave frequency band of about 2.4 GHz. The carrier signal f1 is modulated by at least one low frequency signal f2 which is generated by a generator G2 and preferably at a frequency band in the range of 1 to 30 MHz. As a result of the modulation, a desired supply frequency is generated. A signal of the generated frequency is amplified and transmitted via an antenna A1 disposed around a tire.

Preferably, the modulation means an amplitude modulation. According to the above-mentioned modulation method, a sideband is generated along the carrier frequency, at both right and left sides in a spectrum, for example, at portions of f1+f2 and f1−f2 by the amplitude modulation. When a plurality of frequencies f2 is used, by summing them, the sideband shown in the drawing generates a spectrum. The modulation is switched off by an electronic switch S1, and the electronic switch S1 is periodically controlled by a timer T1.

The tire includes at least one measured value transmitter MG1 (transponder), the measured value transmitter MG1 includes at least one antenna A2, a receiver having at least one diode, and a crystal resonator Q1 which is excited by a received modulation signal. The crystal resonator Q1 changes the resonant frequency on the basis of the tire pneumatic pressure, and again the crystal resonator Q1 is coupled to its own modulator diode or a mixer diode D2, or preferably, a varactor diode which allows parametric gains to be used. Further, the frequency varies on the basis of the measured values. The modulation is switched off at time t1 by the switch S1. Immediately after that, a receiver E1 becomes active at time t2 which is 1 μs after the time t1.

When the modulation of the supply frequency is switched off, the crystal resonator Q1 further excites for about 1 ms. Since the carrier is still in presence, the supply frequency is modulated by the modulation diode D2. However, this happens when only a modulation frequency f2 excites the crystal resonator G1, that is, when the modulation frequency f2 substantially corresponds to a predetermined measured value. Since a supply signal is not modulated by the antenna A1 which can cause interference, the receiver recognizes a modulated signal of an antenna A3 by using an antenna A4, thus a measured value can be obtained through the modulation. When the modulation is not performed or it is performed a little, a predetermined measured value can be repeatedly sampled (see Japanese Patent No. 3494440).

In the transponder MG1, an amplitude modulation wave is detected by a diode D1 so that a modulation wave of the modulation frequency f2 is detected, and then the crystal resonator Q1 is excited by the detected modulation wave. However, it is necessary to increase the modulation degree of the amplitude modulation wave, in order to cause the crystal resonator Q1 to sufficiently excite. On the other hand, when the modulation degree increases to cause the crystal resonator to easily excite, the modulation wave is greatly distorted, thereby causing a spurious problem. Further, if the modulation degree decreases in order to escape the problem, the modulation level is lowered, whereby it is impossible to cause the crystal resonator to sufficiently excite.

SUMMARY OF THE INVENTION

An advantage of the invention is that it prevents the distortion due to the modulation, by causing a sensor of a responder to excite by using an interrogation signal to be output from the controller (interrogator) as a non-modulation signal In order to solve the problems, a tire information detecting apparatus includes an interrogator which transmits an interrogation signal toward a tire in a vehicle at a transmitting timing, and receives a reply signal including tire information such as a tire pneumatic pressure at a receiving timing so as to process the signals, a responder which has a sensor being excited by a predetermined frequency signal to detect the tire information and is disposed in the tire to return the reply signal to the interrogator at the receiving timing in responding to the interrogation signal, and a mixer unit which receives the interrogation signal having a first signal and a second signal which is spaced the predetermined frequency away from the first signal, from the interrogator, and outputs a signal of the frequency difference between the two signals to the responder by mixing the first and second signals.

In addition, only the first signal is transmitted at the receiving timing.

The interrogator includes a first voltage-controlled oscillator for outputting the first signal, a first PLL circuit to which a first reference signal is input and which controls the first voltage-controlled oscillator, a second voltage-controlled oscillator for outputting the second signal, a second PLL circuit to which a second reference signal is input and which controls the second voltage-controlled oscillator. The first signal is input to the first PLL circuit, and the signal of the frequency difference between the first and second signals is input to the second PLL circuit.

The level of the first signal is set to be equal to the level of the second signal.

According to a first aspect of the invention, a tire information detecting apparatus includes an interrogator which transmits an interrogation signal toward a tire in a vehicle at a transmitting timing, and receives a reply signal including tire information such as a tire pneumatic pressure at a receiving timing so as to process the signals, a responder which has a sensor being excited by a predetermined frequency signal to detect the tire information and is disposed in the tire to return the reply signal to the interrogator at the receiving timing in responding to the interrogation signal, and a mixer unit which receives the interrogation signal having a first signal and a second signal which is spaced the predetermined frequency away from the first signal, from the interrogator, and outputs a signal of the frequency difference between the two signals to the responder by mixing the first and second signals. Therefore, only transmitting a signal of two waves instead of transmitting an amplitude modulation wave from the interrogator can cause the sensor to excite. Accordingly, the spurious problem due to the distorted amplitude-modulation wave can be prevented. Further, although the modulation level is lowered, it is impossible to cause the sensor to sufficiently excite.

According to a second aspect of the invention, only the first signal is transmitted at the receiving timing. Therefore, the responder can return a reply signal by modulating the first signal with outputs from the sensor.

According to a third aspect of the invention, the interrogator includes a first voltage-controlled oscillator for outputting the first signal, a first PLL circuit to which a first reference signal is input and which controls the first voltage-controlled oscillator, a second voltage-controlled oscillator for outputting the second signal, a second PLL circuit to which a second reference signal is input and which controls the second voltage-controlled oscillator. The first signal is input to the first PLL circuit, and the signal of the frequency difference between the first and second signals is input to the second PLL circuit. Therefore, for example, the frequency difference is always constant even when, for example, the first signal changes, thereby reliably causing the sensor to excite.

According to a fourth aspect of the invention, the level of the first signal is set to be equal to the level of the second signal. Therefore, even though the first signal and the second signal are 3 dB lowered than a carrier level by a typical amplitude modulation wave, a bit signal (a signal of frequency difference) having the same level as a demodulation signal obtained by demodulating 100% amplitude modulation wave is obtained.

DESCRIPTION OF THE PREFERRED EMBODIMENT

Figure 1:
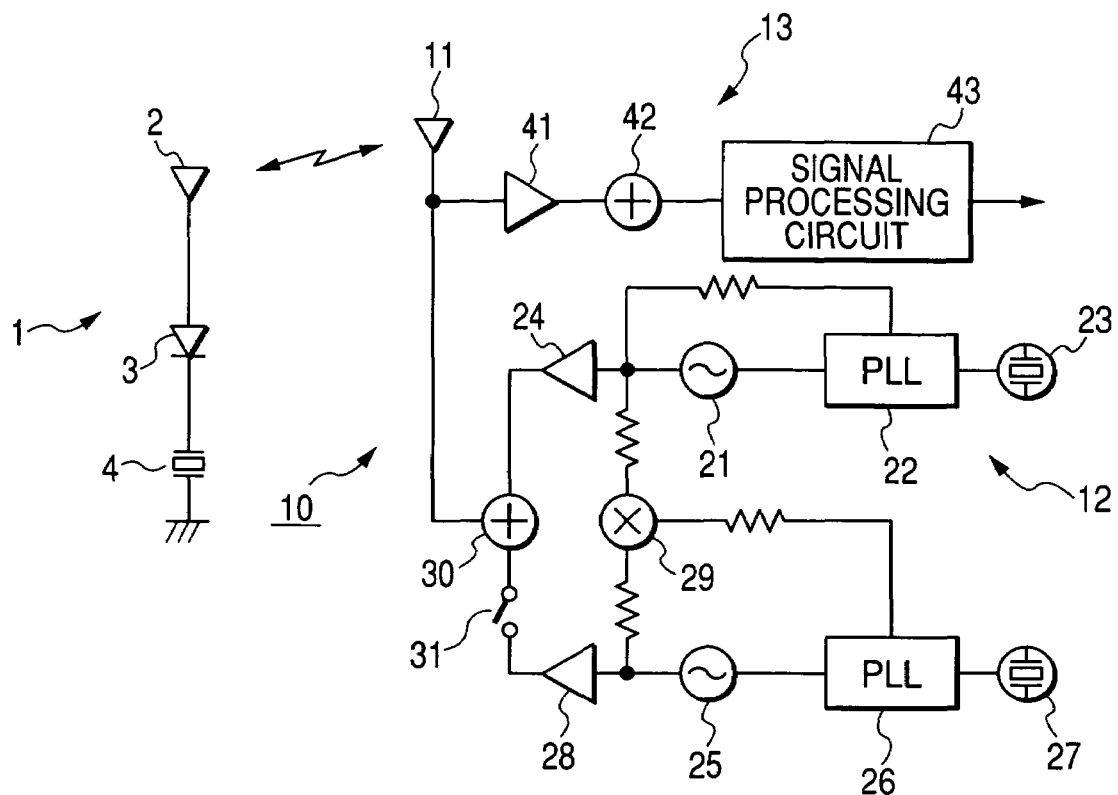
FIG. 1 is a circuit diagram showing a construction of a tire information detecting apparatus according to an embodiment of the invention.

Hereinafter, a tire information detecting apparatus of the invention will now be described with reference to the accompanying drawings. In FIG. 1, a responder 1 is mounted in a tire (not shown) in a vehicle. An interrogator 10 is disposed in a vehicle main body (not shown).

The responder 1 includes an antenna 2, a mixer unit 3 which is coupled to the antenna 2, and a sensor 4 which is coupled to the mixer unit 3. The mixer unit 3 is composed of non-linear elements such as a diode and functions as a frequency converting unit and a modulating unit. In addition, the sensor 4 is composed of a crystal resonator that is self-resonated when being excited by a self-resonant frequency or a frequency (for example, about 10 MHz) close to the self-resonant frequency. The resonant frequency varies on the basis of the tire pneumatic pressure or the temperature of the tire. Sensors 4 are plurally provided corresponding to tire information to be detected.

The interrogator 10 has a transmitter 12 and a receiver 13 which are connected to the antenna 11. The transmitter 12 includes a first voltage-controlled oscillator 21 for generating a first signal (for example, frequency F1=2.4 GHz), a first PLL circuit 22 for controlling the first voltage-controlled oscillator 21, a first reference oscillator 23 for supplying the first reference signal to the first PLL circuit 22, a first transmitting amplifier 24 for amplifying the first signal, a second voltage-controlled oscillator 25 for generating a second signal (for example, frequency F2=2.41 GHz), a second PLL circuit 26 for controlling the second voltage-controlled oscillator 25, a second reference oscillator 27 for supplying a second reference signal to the second PLL circuit 26, and a second transmitting amplifier 28 for amplifying the second signal.

Further, the transmitter 12 further includes a mixer 29 for obtaining a bit signal (a signal of frequency difference) of the first signal to be output from the first voltage-controlled oscillator 21 and the second signal to be output from the second voltage-controlled oscillator 25, an adder 30 for adding an amplified first signal and an amplified second signal, and a switch 31 connected between the second transmitting amplifier 28 and the adder 30. In addition, the adder 30 is coupled to the antenna 11.

The first signal to be output from the first voltage-controlled oscillator 21 is supplied to the first PLL circuit 22, and the bit signal is supplied to the second PLL circuit 26. Predetermined division ratio data is respectively input to the first PLL circuit 22 and the second PLL circuit 26, thus the first voltage-controlled oscillator 21 oscillates at 2.4 GHz, and the second voltage-controlled oscillator 25 oscillates at 2.41 GHz. Therefore, the bit signal becomes 10 MHz. Two oscillation signals are output to the antenna 11 through the adder 30 (when the switch 31 is turned on).

A receiver 13 is provided with a receiving amplifier 41, a demodulator 42, a signal processing circuit 43, etc.

Hereinafter, an operation of the tire information detecting apparatus of the invention will be described. Typical tire information includes the tire pneumatic pressure or the tire temperature; however, for the sake of convenience, an operation for detecting only the tire pneumatic pressure will be described. If the tire temperature should be detected, a sensor required for detecting the tire temperature should be disposed in the responder 1.

Figure 2:
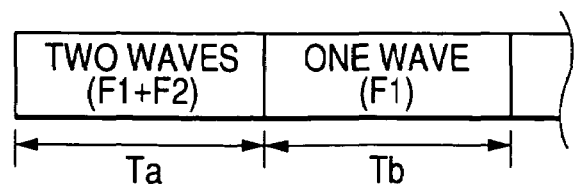
FIG. 2 is a format of an interrogation signal in the tire information detecting apparatus according to the embodiment of the invention.
Figure 3:
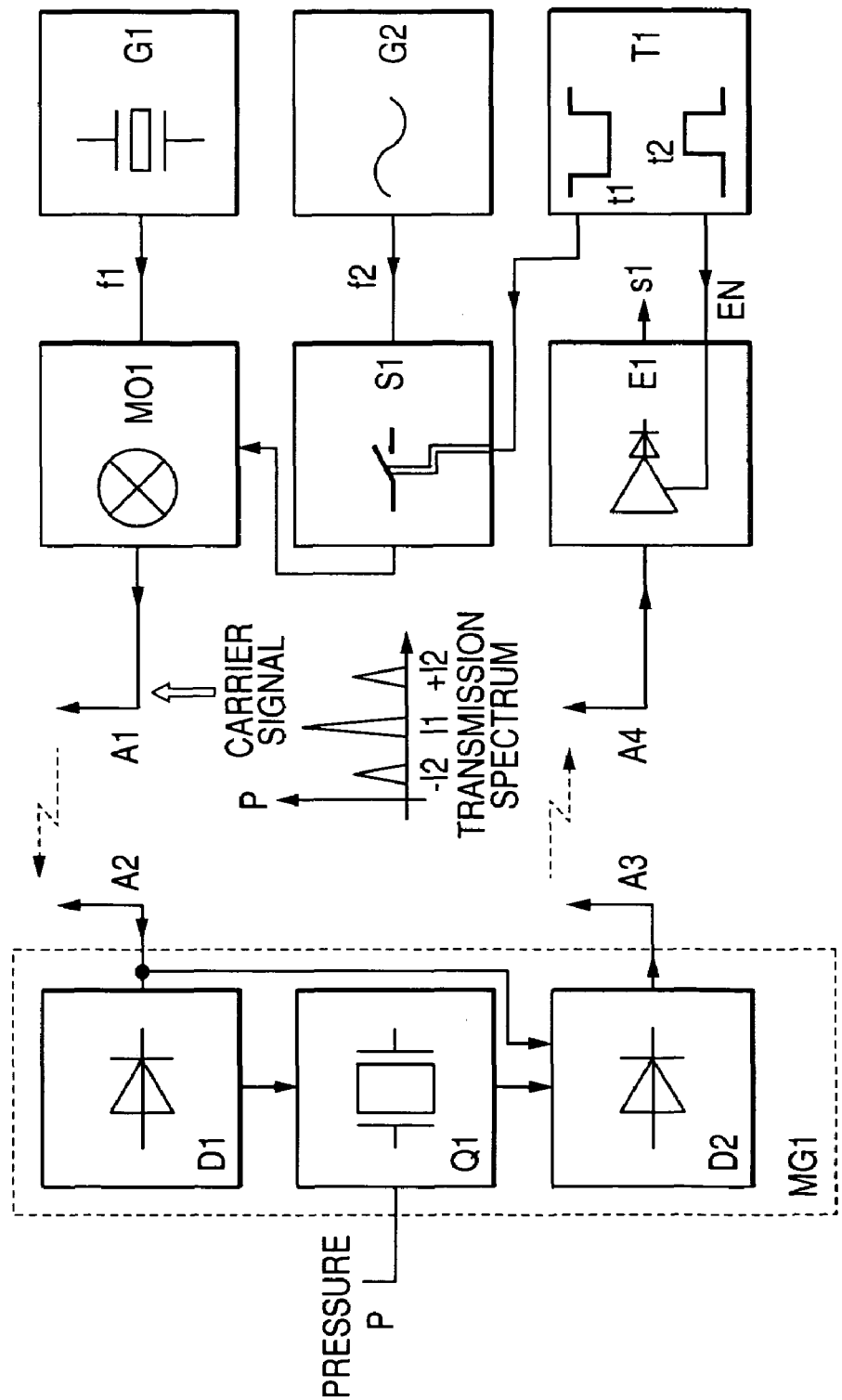
FIG. 3 is a circuit diagram showing a construction of a tire information detecting apparatus according to the related art.

The interrogation signal to be transmitted to the responder 1 is divided into a signal at a transmitting timing Ta and a signal at a receiving timing Tb, as shown in FIG. 2. The switch 31 is closed at the transmitting timing Ta, and is open at the receiving timing Tb. At the transmitting timing Ta for which the switch 31 is closed, the first voltage-controlled oscillator 21 outputs the first signal. The frequency of the first signal is input to the first PLL circuit 22 to be compared to a signal of the first reference oscillator 23. By the division ratio set in the first PLL circuit 22, the first voltage-controlled oscillator 21 oscillates at the first signal frequency (F1=2.4 GHz).

Although the second voltage-controlled oscillator 25 is controlled by the second PLL circuit 26, the frequency difference obtained by the mixer 29 is input to the second PLL circuit 26 for comparison, thus the frequency difference is compared to a reference signal of the second reference oscillator 27. Since the division ratio of the second PLL circuit 26 is set such that the frequency difference is equal to a self-resonant frequency of the sensor 4 or a frequency (for example, about 10 MHz) close to the self-resonant frequency, the second voltage-controlled oscillator 25 oscillates at the second signal frequency (F2=2.41 GHz). The first and second signals are transmitted at the same level.

The first signal (F1) output from the first voltage-controlled oscillator 21 and the second signal (F2) output from the second voltage-controlled oscillator 25 are dispersed from the antenna 11 via the adder 30. That is, a signal of two waves (F1+F2) is transmitted. The frequency difference between the first signal and the second signal is set to be equal to the self-resonant frequency of the sensor 4 or a frequency close to the self-resonant frequency.

In the responder 1, a signal of two waves received from an antenna 2 is input to a diode serving as the mixer unit 3; at this moment, a frequency difference, which is a bit of two waves, is generated. A signal of the frequency difference causes the sensor 4 to excite, and the sensor oscillates at the self-resonant frequency.

Since the switch 31 is open at the receiving timing Tb, only the first signal F1 is transmitted.

In the responder 1, since a resonance signal output from the sensor 4 remains for some time after the transmitting timing Ta is terminated, the first signal transmitted at the next receiving timing Tb is amplitude-modulated. The amplitude-modulation is implemented by the mixer unit 3. Since the self-resonant frequency changes to a frequency corresponding to the tire pneumatic pressure, the change in the self-resonant frequency becomes tire information.

A modulated wave which is amplitude-modulated by the mixer unit 3 has the first signal and sideband signals at both sides of the first signal which are spaced 10 MHz away from the first signal. The modulated wave becomes a reply signal, and then the reply signal is dispersed from the antenna 2 so as to be received by the antenna 11 of the interrogator 10. After that, the signal is amplified by the amplifier 41, demodulated by the demodulator 42, and then the signal of 10 MHz is processed by the signal processing circuit 43, so that the tire pneumatic pressure information is extracted. The information is displayed on a display unit (not shown).

As described above, only transmitting a signal of two waves instead of transmitting an amplitude modulation wave from the interrogator 10 can cause the sensor 4 to excite. Therefore, the spurious problem due to the distorted amplitude-modulation wave can be prevented. Although the modulation level is lowered, it is possible to satisfactorily excite the sensor 4. In addition, even though the first signal and the second signal are set at the same level, and are 3 dB lowered than a carrier level by a typical amplitude modulation wave, a bit signal (a signal of frequency difference) having the same level as a demodulation signal obtained by demodulating 100% amplitude modulation wave is obtained.

Since the signal to be input to the second PLL circuit 26 for comparison is set as the frequency difference between the first signal and the second signal, the frequency difference (10 MHz) is always constant even when, for example, the first signal changes, thereby reliably exciting the sensor 4. Further, since the second PLL circuit 26 is phase-controlled by comparison to a low frequency, the apparatus can be constituted at low cost.

The invention claimed is:

1. A tire information detecting apparatus, comprising:

an interrogator which transmits an interrogation signal toward a tire in a vehicle at a transmitting timing, and receives a reply signal including tire information at a receiving timing so as to process the reply signal;

a responder which has a sensor being excited by a predetermined frequency signal to detect the tire information and is disposed in the tire to return the reply signal to the interrogator at the receiving timing in responding to the interrogation signal;

a mixer unit which receives the interrogation signal having a first signal and a second signal which is spaced away from the first signal by an amount equal to the predetermined frequency, from the interrogator, and outputs a signal of the frequency difference between the first and second signals to the responder by mixing the first and second signals, wherein the interrogator includes a first voltage-controlled oscillator for outputting the first signal, a first PLL circuit to which a first reference signal is input and which controls the first voltage-controlled oscillator, a second voltage-controlled oscillator for outputting the second signal, a second PLL circuit to which a second reference signal is input and which controls the second voltage-controlled oscillator, and wherein the first signal is input to the first PLL circuit, and the signal of the frequency difference between the first and second signals is input to the second PLL circuit, where the signal of the frequency difference between the first and second signals is input to the sensor.

2. The tire information detecting apparatus according to claim 1, wherein only the first signal is transmitted at the receiving timing.

3. The tire information detecting apparatus according to claim 1, wherein a level of the first signal is set to be equal to a level of the second signal.

4. The tire information detecting apparatus according to claim 1, wherein the frequency difference is constant when the first signal changes.

* * * * *